Nov. 4, 1924.  1,513,996

G. E. INGRAM

FUEL ECONOMIZER

Filed Nov. 4, 1922

Inventor
George E. Ingram
By Arthur L. Slee
Atty

Patented Nov. 4, 1924.

1,513,996

UNITED STATES PATENT OFFICE.

GEORGE E. INGRAM, OF RONAN, MONTANA.

FUEL ECONOMIZER.

Application filed November 4, 1922. Serial No. 599,131.

*To all whom it may concern:*

Be it known that I, GEORGE E. INGRAM, a citizen of the United States, residing in the city of Ronan, county of Missoula, and State of Montana, have invented a new and useful Improvement in a Fuel Economizer, of which the following is a specification.

My invention relates to fuel economizers for internal combustion motors and the like and is an improvement upon my former invention for a fuel gage patented May 7th, 1918, Patent #1,265,336.

In the present invention, a fuel gage arranged to normally admit a predetermined charge of gas into the cylinder at each suction stroke of the piston, is provided with an auxiliary intake serving as a by-pass through which gas from the carburetor may be admitted to the cylinder during the suction stroke to increase the charge above that normally delivered by the gage.

The primary object of my invention is, therefore, to provide means operating in conjunction with a fuel gage for increasing the charge delivered to the cylinder above that normally delivered by the gage.

Another prime object is to provide a device whereby the amount of gas supplied to a cylinder may be restricted to facilitate starting.

A further object is to provide means for regulating the supply of fuel to an engine whereby the compression chamber of a cylinder may be reduced in size to obtain greater compression of the fuel and thereby increase the efficiency of the motor.

A still further object is to provide an improved device wherein an auxiliary intake valve is mounted in connection with a fuel gage and arranged to be operated from the dash of a vehicle to render said gage inoperative when desired.

I accomplish these and other objects by means of the device disclosed in the drawings forming a part of the present specification wherein like characters of reference are used to designate similar parts throughout said specification and drawings, and in which.

Figure 1:
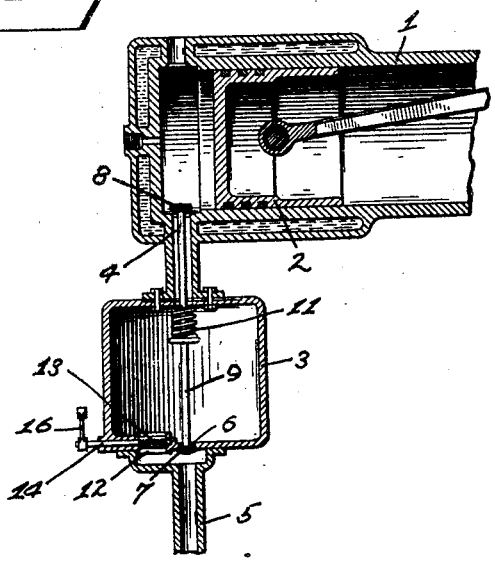
Fig. 1 is a vertical sectional view of my improved device applied to a cylinder of an internal combustion motor, the parts being shown in the normal position during the suction sroke of the motor.
Figure 2:
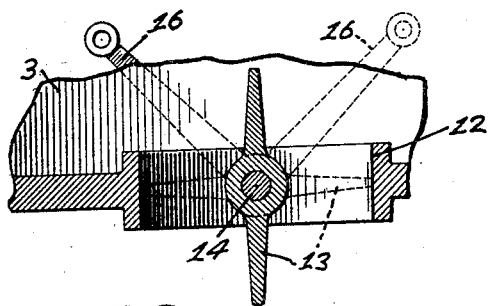
Fig. 2 is a broken sectional detail of the auxiliary intake valve, the valve being shown in full lines in the open position and dotted lines in the closed position.
Figure 3:
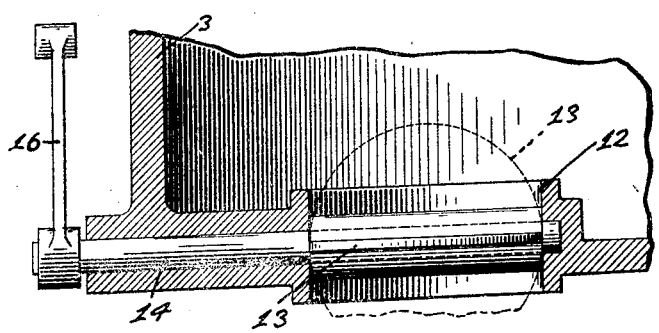
Fig. 3 is a broken horizontal sectional view disclosing the operation of the auxiliary intake valve.

Referring to the drawings the numeral 1 is used in general to designate a cylinder of an internal combustion motor within which is slidably mounted the usual piston 2. A fuel receiver 3 is connected to the intake port 4 of the cylinder 1, said receiver being provided with an intake port 6, communicating with a fuel supply, not shown, through a supply passage 5. A valve 7 provided for the intake 6 is rigidly connected to the stem of valve 8 provided for the cylinder intake port 4 by a rigid member 9, the valves being normally actuated by a spring 11 to close the cylinder intake and open the receiver intake in the manner fully described in my former invention to which reference has hereinbefore been made. In the normal operation of the device, the suction stroke of the piston opens the intake valve 8 of the cylinder and, by virtue of the rigid connection 9, closes the intake valve 7 of the receiver, the suction within the cylinder operating to draw a charge of fuel gas from the receiver. At the end of the stroke, the pressures within the cylinder and the receiver being equal, the spring operates to move the valves 7 and 8 to their normal positions, thereby permitting the fuel to be compressed within the cylinder as the piston moves upon its pressure stroke, and a fresh charge of gas to be drawn into the receiver by the partial vacuum formed therein during the suction stroke. In this manner the quantity of fuel admitted to the cylinder at each suction stroke is limited to the quantity which the vacuum formed will draw from the receiver. The size of the receiver may be regulated to deliver the amount of gas best suited to give greatest efficiency in any particular type and size cylinder.

In this connection, however, it has been found that by limiting the supply of fuel to increase the efficiency the power available is similarly limited, and in instances when a greater amount of power is required, it is necessary to provide means for admitting a greater amount of fuel during the suction stroke than is delivered from the receiver.

To accomplish this I have provided an auxiliary intake port 12 communicating between the receiver 3 and the supply passage 5 forming a by-pass normally closed by a suitable valve 13 so as not to interfere with the normal operation of the intake past the valve 7.

In the drawings I have illustrated one manner in which the valve may be mounted. In this connection a butterfly valve 13 is secured upon a pivotally mounted stem 14 extending outwardly from the side of the receiver 3, a lever 16 being secured upon the outer end which may be connected in any suitable manner with any desired operating means whereby the valve 13 may be moved at will from the closed position to the open position, or from open to closed position.

When it is desired to admit a greater quantity of fuel to the cylinder than is delivered by the receiver, the lever 16 is moved to open the valve 13, thereby permitting the section from the cylinder to draw fuel from the carburetor or other device from which fuel is normally delivered to the receiver 3. As the fuel at the source is under greater pressure than the fuel in the receiver, it follows that a greater quantity will be drawn into the cylinder than from said receiver wherein the pressure is progressively reduced during the suction stroke of the piston. The increased amount of fuel will be compressed within the same space as normally occupied by the normal charge so that in addition to the amount of fuel there will also be an increased compression tending to give increased power.

Should the increased power be required only for a momentary emergence the valve 13 may be returned to the closed position so that the fuel gage will operate in its normal manner.

By means for the above described device the power and efficiency of an engine may be permanently increased. This is accomplished by causing the compression chamber of the cylinder to be made of a volume much smaller than in ordinary practice, the size of the compression chamber and the receiver being so related that the limited charge delivered from the receiver into the cylinder will be compressed to the degree normally attained in common practice. The delivery of a small charge operating under normal compression will thus deliver more power within the cylinder than the same amount of fuel delivered into a similar cylinder having the ordinary compression space wherein the fuel would be compressed to a lesser degree. When now the valve 13 is opened to admit fuel into the receiver during the intake stroke of the piston the normal charge will be drawn into the cylinder, and upon the following compression stroke this charge will be compressed to a degree much above normal due to the restricted compression space within the cylinder. This, of course, will result in an increased efficiency. However, as the compression of the normal charge within the limited compression space would materially increase the efforts required in starting so that an engine so constructed could not be ordinarily started by hand or by the ordinary electric starter, it is essential that the charge in starting be restricted to a limited amount gaged to give the desired degree of compression within the cylinder. The motor may thus be readily started, and after the desired speed has been attained the valve 13 opened thereby admitting the full charge of fuel at each suction stroke. The speed and the increased power of the engine readily effects the increased compression so that an increased amount of power may be obtainable from a given quantity of fuel, or, which amounts to the same thing, a given amount of power may be obtained from a lesser amount of fuel due to increased compression within the cylinder.

From the above description it will be seen that I have provided an improved device adapted to limit the amount of fuel normally supplied to a cylinder during ordinary operation to obtain greatest efficiency from the fuel, and to permit the compression within a cylinder to be increased to get a greater delivery of power from the fuel consumed without causing increased resistance in starting.

I do not wish to limit myself to the precise construction and arrangement of my auxiliary valve 13 as any suitable valve operating in a by-pass from the fuel supply to the cylinder may be utilized for the same purpose and with the same result.

Having thus described my invention what I claim as new and desire to secure by Letters Patent is:

1. A fuel economizer comprising the combination with a cylinder and a piston slidably mounted therein, of a fuel gas receiver having an intake port communicating with a source of fuel supply and an outlet port connected to the intake of the cylinder; means operatively mounted in connection with said intake and outlet ports to normally admit only a limited quantity of fuel to the cylinder at each suction stroke of the piston therein; an auxiliary intake port communicating between the cylinder and the fuel supply; and means for opening said auxiliary intake independently of the normal intake to admit a greater quantity of fuel to the cylinder when increased power is desired.

2. A fuel economizer comprising the combination with a cylinder and a piston slidably mounted therein, of a fuel gas receiver having an intake port connected with a fuel supply and an outlet port connected with the intake port of the cylinder; means adapted for normally closing the outlet port and opening the intake port of the receiver and arranged to be operated by the suction stroke of the piston to close said intake and open said outlet to admit a charge of gas from said receiver into the cylinder; an auxiliary port forming a by-pass between the receiver and the source of fuel supply; and means normally closing said auxiliary port arranged to be independently operated to open said port to admit fuel from the supply to the receiver independently of the normal intake to permit a quantity of fuel in excess of the charge contained within the receiver to be admitted into the cylinder during the suction stroke when greater power is required.

3. A fuel economizer comprising the combination with a cylinder and a piston slidably mounted therein, of a fuel gas receiver having an intake port communicating with a source of fuel supply and an outlet port connected to the intake of the cylinder; means adapted for normally closing the outlet port and opening the intake port of the receiver to admit fuel to the receiver and arranged to be operated by the suction stroke of the piston to close the intake and open the outlet to admit a charge of fuel from said receiver into the cylinder, the quantity of said charge being limited by the size of the receiver and the compression space within the cylinder being arranged to obtain normal compression of the limited charge; an auxiliary port formed in the receiver and connected to the fuel supply; and means normally closing said auxiliary port arranged to be operated to open said auxiliary port to admit fuel from the supply to the receiver during the intake stroke independently from the normal intake to permit a quantity of fuel in excess of the charge normally contained within the receiver to be drawn into the cylinder during said intake stroke, said excess fuel being compressed to a higher degree to give greater power and efficiency.

4. The combination with a cylinder and a piston slidably mounted therein, of a fuel gas receiver having an intake port connected with a fuel supply and an outlet port connected with the intake of the cylinder; means operatively mounted within the receiver and the intake and outlet ports thereof adapted for normally closing said outlet port and opening said intake port of the receiver and arranged to be operated by the suction stroke of the piston to open the outlet port and close the intake port of said receiver to admit a charge of fuel gas from said receiver into the cylinder; an auxiliary port forming a by-pass between the receiver and the fuel supply; and a valve operatively mounted within said auxiliary port to normally close the same and arranged to be moved to open said port to admit fuel from the supply during the suction stroke of the piston independently from the normal intake port to permit a charge of gas to be drawn into the cylinder in excess of the charge contained within the receiver when greater power is desired.

In witness whereof I hereunto set my signature.

GEORGE E. INGRAM.